UNITED STATES PATENT OFFICE.

CHARLES POPE, OF CHICAGO, ILLINOIS.

METHOD OF TREATING STARCH.

SPECIFICATION forming part of Letters Patent No. 595,408, dated December 14, 1897.

Application filed April 6, 1895. Serial No. 544,787. (No specimens.)

*To all whom it may concern:*

Be it known that I, CHARLES POPE, a citizen of the United States, residing at Chicago, in the county of Cook and State of Illinois, have invented a certain new and useful Improvement in Methods of Treating Starch, which is fully set forth in the following specification.

My invention relates to an improved method of drying and treating moist crude starch to prepare it for market.

Heretofore it has been customary to pour the wet starch into molds and allow it to drain, and after allowing it to remain in the molds for about twenty-four hours for the water to drain out of the starch the starch is then submitted to a drying process by which it is thoroughly dried. In this treatment of starch I found that the impurities remain in the starch, the starch acting as a filter, filtering the water that runs off and retaining the impurities.

My invention consists in running the starch into molds and submitting the starch while in the molds to a pressure, pressing the water out of the starch, and at the same time pressing the impurities out of the starch with the water. I preferably submit the starch while in the molds to a pressure of about five hundred pounds to the square inch. The starch after being thus pressed is dried in cakes, when it is ready for market. I preferably, however, after removing the starch from the molds in which it is pressed to a pressure as above specified, place the cakes of starch in a hydraulic press and submit them to a pressure of about two thousand pounds to the square inch, thus removing a much larger per cent. of the moisture from the cakes of starch and reducing the size of the cakes very materially, and at the same time depriving them of much more of the water and impurities and enabling me to dry them much quicker and more satisfactorily.

When the cakes of starch are treated without pressure and then submitted to the drying process, they are comparatively large and crack on the exterior surface before the interior becomes dry, so that it is customary to scrape off the outside of the cakes of starch in order to produce a smooth exterior to the cake.

By compressing the cakes I am not only able to make purer starch by reason of pressing the impurities out of the starch with the water, but I am able to dry my starch with smooth surfaces to the dried cakes without the expense or necessity of scraping or otherwise treating the cakes to give them a smooth and attractive appearance.

I find that I am able by my method of treating starch in preparing it for market to prepare my starch for drying in from fifteen to twenty minutes' time instead of twenty-four hours' time required by the old method. I also require much less space for handling and preparing my starch for drying, as well as much less drying-space for drying my starch after it is pressed into cakes.

I have been manufacturing starch for many years, and find my improved method of treating starch by pressing the water from the starch instead of draining it from the starch is a very great saving in time required in treating the starch, makes a much purer starch, makes perfectly smooth and very compact cakes of starch, and the starch thus compressed and dried retains its compactness without disintegration for a long time.

Having thus fully described my improved method of treating starch, what I claim, and desire to secure by Letters Patent, is—

1. Taking moist, crude starch, pouring it into molds and submitting it to a pressure in the molds, pressing out the water and impurities; pressing the starch into solid, compact cakes, and then drying it.

2. Taking moist, crude starch, pouring it into molds; submitting it to a pressure while in the molds, pressing the water and impurities from the starch; then after removing the cakes of starch from the molds, submitting them to a second pressure in a hydraulic or other powerful press, further expressing the moisture and impurities and reducing the size of the cakes; and then drying the cakes.

CHARLES POPE.

Witnesses:
 ALOYSIA HELMICH,
 A. A. MURRAY.